(12) United States Patent
Kajiwara et al.

(10) Patent No.: US 9,322,596 B2
(45) Date of Patent: Apr. 26, 2016

(54) DRYING DEVICE AND METHOD OF AQUEOUS MOISTURE GEL

(75) Inventors: Koichi Kajiwara, Tokyo (JP); Ryohei Maehana, Tokyo (JP); Shungo Kuwatani, Tokyo (JP); Kiyoshi Kanamura, Tokyo (JP)

(73) Assignee: TOKYO METROPOLITAN UNIVERSITY, Tokyo (JP)

( * ) Notice: Subject to any disclaimer, the term of this patent is extended or adjusted under 35 U.S.C. 154(b) by 1197 days.

(21) Appl. No.: 12/708,410

(22) Filed: Feb. 18, 2010

(65) Prior Publication Data

US 2010/0207050 A1   Aug. 19, 2010

(30) Foreign Application Priority Data

Feb. 19, 2009   (JP) .................. 2009-036476

(51) Int. Cl.
*C03C 3/04* (2006.01)
*C09K 11/08* (2006.01)
(Continued)

(52) U.S. Cl.
CPC ............ *F26B 21/083* (2013.01); *B01J 20/103* (2013.01); *B01J 20/186* (2013.01); *B01J 20/28047* (2013.01); *B01J 20/28064* (2013.01); *B01J 20/28071* (2013.01); *B01J 20/28073* (2013.01);
(Continued)

(58) Field of Classification Search
CPC .. B01J 20/103; B01J 20/186; B01J 20/28047; B01J 20/28064; B01J 20/28071; B01J 20/28073; B01J 20/28076; B01J 20/28083; B01J 21/08; C01B 33/158; C03B 19/12; F26B 21/083

USPC ............................................... 252/62; 34/472
See application file for complete search history.

(56) References Cited

U.S. PATENT DOCUMENTS

| 3,977,993 A | * | 8/1976 | Lynch ........................ 423/338 |
| 5,243,769 A |   | 9/1993 | Wang et al. |
| 5,343,633 A |   | 9/1994 | Wang et al. |

FOREIGN PATENT DOCUMENTS

| JP | 55-090414 | 7/1980 |
| JP | 59-24169 | 2/1984 |

(Continued)

OTHER PUBLICATIONS

Tatsuhiko Adachi, et al "Preparation of monolithic silica gel and glass by the sol-gel method using N,N-dimethylformamide" Journal of Materials Science 22 (1987) 4407-4410.

(Continued)

*Primary Examiner* — Shuangyi Abu Ali
(74) *Attorney, Agent, or Firm* — Workman Nydegger

(57) ABSTRACT

The formation of cracks is suppressed in a drying process for a water-containing wet gel without modifying the gel and without using a reagent. A water-containing wet gel is dried by removing water and then removing the remaining solvent. For example, a wet-gel container storing water-containing wet gel, containing a wet gel and a solvent, is heated. The solvent is vaporized into an upper space of the wet-gel container. The solvent-containing gas diffuses into a dehydrating agent container, and water is removed by a dehydrating agent. This state is maintained for one to two days to remove almost all amount of water from the solvent. Thereafter, the dehydrating agent container is detached and the wet gel, from which water has been removed, is heated to almost completely remove the solvent, and further heated at a higher temperature to completely remove the solvent to obtain a crack-free dry gel.

9 Claims, 2 Drawing Sheets

(51) Int. Cl.

| | | |
|---|---|---|
| *E04B 1/74* | (2006.01) | |
| *B01J 21/08* | (2006.01) | |
| *F26B 21/08* | (2006.01) | |
| *B01J 20/10* | (2006.01) | |
| *B01J 20/18* | (2006.01) | |
| *B01J 20/28* | (2006.01) | |
| *C01B 33/158* | (2006.01) | |
| *C03B 19/12* | (2006.01) | |

(52) U.S. Cl.
CPC ...... *B01J 20/28076* (2013.01); *B01J 20/28083* (2013.01); *B01J 21/08* (2013.01); *C01B 33/158* (2013.01); *C03B 19/12* (2013.01)

(56) References Cited

FOREIGN PATENT DOCUMENTS

| | | |
|---|---|---|
| JP | 59-128205 | 7/1984 |
| JP | 60-131834 | 7/1985 |
| JP | 64-087523 | 3/1989 |
| JP | 06-219726 | 8/1994 |
| JP | 09-263413 | 10/1997 |
| JP | 10-130003 | 5/1998 |
| JP | 2000-044225 | 2/2000 |
| JP | 2001-158615 | 6/2001 |
| JP | 2001-518875 | 10/2001 |
| JP | 2002-028472 | 1/2002 |
| JP | 2008-222527 | 9/2008 |

OTHER PUBLICATIONS

Hiromitsu Kozuka, et al "Formation of Particulate Opaque Silica Gels from Highly Acidic Solutions of Tetramethoxysilane" Chemistry of Materials 1989, 1, 398-404.

Fikret Kirkbir, et al "Drying and Sintering of Sol-Gel Derived Large SiO2 Monoliths" Journal of Sol-Gel Science and Technology, 6, 203-217 (1996).

Suda, Seiichi, et al., Formation Mechanism of Amorphous Na2O-SiO2 Spheres Prepared by Sol-gel and Ion-exchange Method, Journal of Non-Crystalline Solids, 2003, vol. 321, No. 1-2, p. 3-9.

JPO, Office Action in related foreign application (JP 2009-036476) to which priority is claimed by the present application; Jul. 14, 2010.

"Japanese Chemical Dictionary, Version 6", dated 1979, pp. 70, 71, and 946.

Kozuka, H. and Sakka, S., "Preparation of gold colloid-dispersed silica-coating films by the sol-gel method," Chem. Mater, vol. 5, No. 2, pp. 222-228, Feb. 1993.

\* cited by examiner

DRYING DEVICE AND METHOD OF AQUEOUS MOISTURE GEL

CROSS-REFERENCE TO RELATED APPLICATIONS

This application claims priority to Japanese Patent Application No. 2009-036476 filed Feb. 19, 2009, which is incorporated herein by reference.

TECHNICAL FIELD

Embodiments relate to methods for drying a water-containing wet gel and to apparatuses for use with these methods.

BACKGROUND

A sol-gel method for synthesizing a gel has the following advantages: Synthesis is performed at a low temperature compared to a fusion method and a mixing method in a vapor phase; Fluorine can be densely doped; A SiF group introduced as a result of doping removes a SiOH group, thereby improving light permeability in a vacuum ultraviolet region.

Because of these advantages, the sol-gel method has technically attracted attention as a new synthesis method of functional glass, ceramics and inorganic-organic complexes in the field of materials. However, the sol-gel method has the following drawback. In a process for drying a wet gel to obtain a dry gel, a gas/liquid interface (meniscus) is formed in a pore of the gel as a solvent is vaporized, with the result that capillarity is produced at the interface, contracting the gel. Cracks are therefore easily formed in the dried gel.

Water is used for preparing numerous wet gels as a polymerizing agent for a monomer and a solvent. Water has a large surface tension compared to other solvents of general use such as alcohols and has a high boiling point. Therefore, water is concentrated in a final stage of a drying process, producing large capillarity. For this reason, it is extremely difficult to dry a water-containing wet gel in a short time and to obtain a large dry gel. To obtain a highly reproducible dry gel while suppressing cracks, it is necessary to reduce capillarity, which is a cause of contraction stress, during a drying process, and to vaporize a solvent uniformly from the whole gel to contract the gel uniformly.

As methods for obtaining a crack-free dry gel, a chemical method and a physical method have conventionally been known in the art. In the chemical method, for example, a reagent is added in a process for producing a gel to modify e.g., the chemical structure of a gel skeleton. Examples of the methods known in the art include (1) a method in which a wet gel is prepared by adding a solvent having a high boiling point and a low surface tension as a drying control agent and capillarity is reduced in the final stage of drying (see, for example, T. Adachi et al. J. Mater. Sci. 4407, 22 (1987)), (2) a method in which a pore diameter of a wet gel is increased, in consideration of capillarity, which increases inversely in proportion to a pore diameter (for example, see H. Kotuku et al. Chem. Mater. 1, 398 (1989)), (3) a method in which micro particles are added to a wet gel, thereby increasing the pore diameter of the wet gel and improving the strength of the wet gel (see, for example, Japanese Patent Laid-Open Nos. 60-131834 and 64-87523), and (4) a method in which the chemical structure of a gel skeleton is modified to reduce capillarity while enhancing flexibility of the gel (see, for example, Japanese Patent Laid-Open No. 6-219726).

On the other hand, in the physical method, a crack-free dry gel is obtained without virtually modifying a wet gel. Examples of the physical methods known in the art include (5) a method in which a gel is extremely slowly dried to contract the gel uniformly, (6) a method in which a gel is dried under the temperature and the atmosphere strictly controlled (see, for example, Japanese Patent Laid-Open Nos. 6-219726, 2001-158615 and 2002-28472; U.S. Pat. Nos. 5,243,769 and 5,343,633; and F. Kirkaig et al. J. Sol-Gel Sci. Technol. 6, 203 (1996)), and (7) a method in which a gel is dried in a supercritical state, thereby eliminating the gas/liquid interface to prevent capillarity effect.

However, in the chemical methods, for example, the chemical composition and the production conditions of a gel are extremely limited. In addition, the reagents to be added may sometimes have toxicity such as carcinogenicity. Therefore, it is sometimes difficult to put the chemical method into a practical use. Also, the physical methods have problems. In the method (5), an extremely long time is required for preparing a dry gel. In the method (6), the solvent in a wet gel must be replaced once with a solvent easily dried and a special gas is required for drying. In the method (7), a pressure-proof container is required and the solvent of a wet gel must be replaced once with a solvent ($CO_2$) easily performing supercritical drying. Therefore, the gel is limited in size by the size of the pressure-proof container.

SUMMARY

According to aspects of the embodiments disclosed herein, in drying a wet gel containing a water-containing organic solvent, (i.e., a water-containing wet gel), first, water, which is a solvent having a large surface tension, is removed from the water-containing wet gel, and then, the remaining solvent is removed and dried, thereby drastically suppressing formation of cracks.

Embodiments disclosed herein relate to methods for drying a gel while suppressing formation of cracks in the gel, without modifying the gel in a process for drying a water-containing wet gel containing a water-containing solvent and without using a reagent, such as an organic solvent and a gas, for suppressing formation of cracks. Other embodiments relate to apparatuses for use in such methods.

Various embodiments disclosed herein relate to methods and apparatuses for drying a water-containing wet gel as described below.

(1) A method for drying a water-containing wet gel comprising the steps of first removing water from the water-containing wet gel to reduce a water content of the water-containing wet gel and then removing the remaining solvent to dry the wet gel.

(2) The method for drying a water-containing wet gel according to the item (1), wherein the step of removing water is performed by exposing a gas containing solvent vapor from the water-containing wet gel to a dehydrating agent.

(3) The method for drying a water-containing wet gel according to the item (2), wherein the step of removing water is performed by feeding a solvent-vapor containing gas present in a water-containing wet gel storage section for storing the water-containing wet gel to a dehydrating agent storage section to expose the solvent-vapor containing gas to the dehydrating agent, and thereafter, feeding back the solvent-vapor containing gas exposed again to the water-containing wet gel storage section.

(4) The method for drying a water-containing wet gel according to the item (2), wherein the step of removing water is performed by diffusing solvent vapor from a water-containing wet gel storage section for storing the water-containing wet gel to a dehydrating agent storage section through a hole formed in the dehydrating agent storage section to expose the solvent vapor to a dehydrating agent stored in the dehydrating agent storage section.

(5) The method for drying a water-containing wet gel according to any one of the items (2) to (4), wherein the dehydrating agent is a molecular sieve.

(6) The method for drying a water-containing wet gel according to any one of the items (1) to (5), wherein the water-containing wet gel is a water-containing silica gel.

(7) The method for drying a water-containing wet gel according to any one of the items (1) to (6), wherein the solvent other than water is an organic solvent such as an alcohol, an amide, a hydrocarbon, a ketone, an ester and an ether.

(8) An apparatus for drying a water-containing wet gel comprising a water-containing wet gel storage section, a dehydrating agent storage section, and a communication part connecting the water-containing wet gel storage section and the dehydrating agent storage section.

(9) The apparatus for drying a water-containing wet gel according to item (8), wherein the communication part is a communication pipe and a gas supply apparatus is provided to the communication pipe.

(10) The apparatus for drying a water-containing wet gel according to item (8), wherein the communication part is a hole provided in a boundary surface between the water-containing wet gel storage section and the dehydrating agent storage section.

(11) The apparatus for drying a water-containing wet gel according to items (8) to (10), further comprising a heating section.

(12) The apparatus for drying a water-containing wet gel according to any one of items (8) to (11), wherein the dehydrating agent is a molecular sieve.

(13) The apparatus for drying a water-containing wet gel according to any one of items (8) to (12), wherein the water-containing wet gel is a water-containing wet silica gel.

1. Since methods and apparatuses for drying a water-containing wet gel involve a physical approach for drying the gel without modifying the water-containing wet gel, it is possible to obtain a crack-free dry gel, regardless of the type of compound constituting the gel, making them available to be substantially universally used.

2. Furthermore, since methods and apparatuses for drying a water-containing wet gel can employ a dehydrating agent that can be easily regenerated, such as a molecular sieve (zeolite), as means for reducing the content of water in the water-containing wet gel, the dehydrating agent can be used repeatedly and the water-containing wet gel can be easily dried in a simple mechanism.

3. Moreover, since methods and apparatuses for drying a water-containing wet gel require no specific reagent or gas for suppressing formation of cracks in a dry gel in a process for removing water and require no specific container or device such as a pressure-proof container, a dry gel can be produced at low cost.

4. Additionally, since methods and apparatuses for drying a water-containing wet gel can be carried out and used in normal pressure, a specific device such as a pressure-proof container or creation of a supercritical state is not required according to certain aspects. Therefore, the size of a wet gel is not limited by the volume of a container. As a result, a large apparatus for drying a wet gel can be formed and a large-size dry gel can be prepared without using a specific instrument.

DETAILED DESCRIPTION

Figure 1:
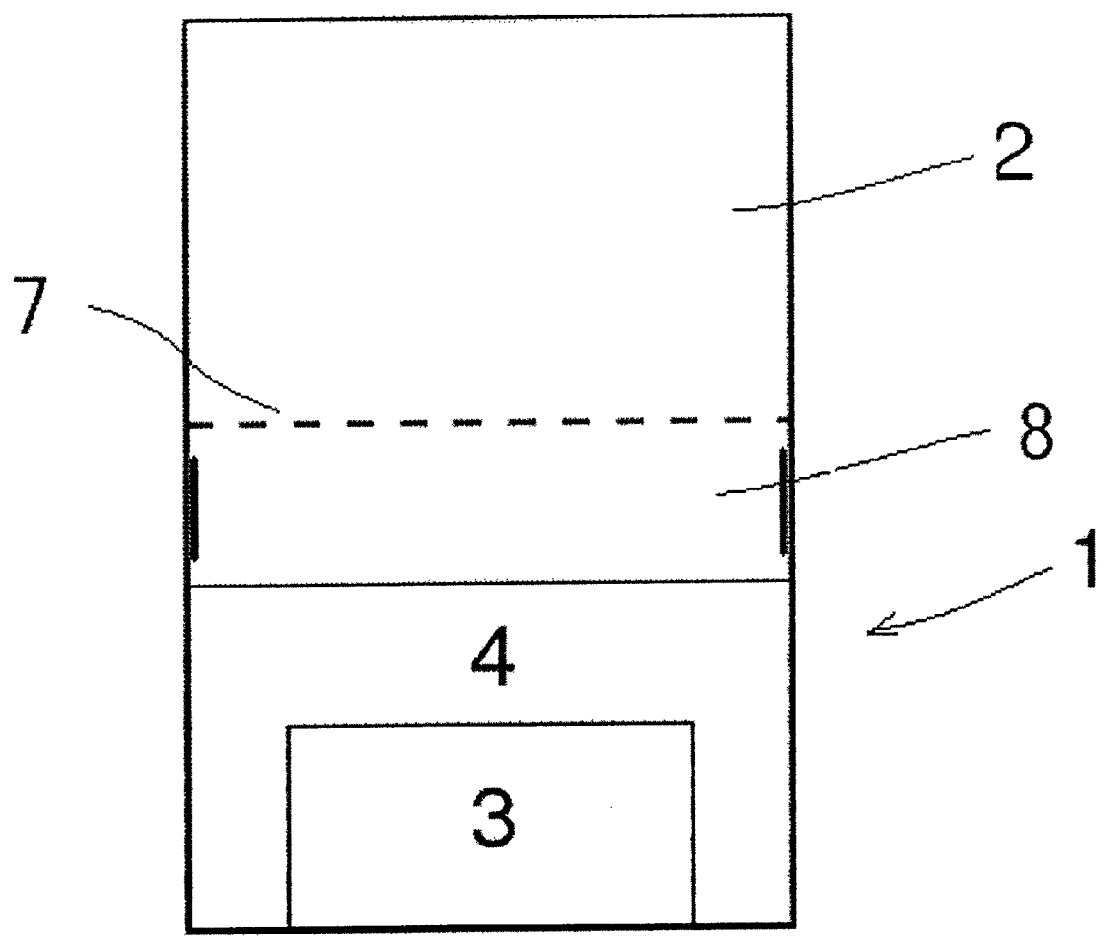
FIG. 1 is a schematic view of an example of an apparatus for drying a water-containing wet gel.

Embodiments will be more specifically described below. As described above, when a water-containing wet gel is dried, cracks are formed in a dry gel. One of the causes thereof is contraction of pores of the wet gel during a drying process. The contraction occurs since the surface tension of a solvent is applied to the pores of the wet gel. Since water has a large surface tension compared to other solvents of general use and a high boiling point, water remains in the pores after other solvents are vaporized as a drying process proceeds. As a result, a large surface tension is applied to the pores and induces contraction of the pores. According to embodiments described herein, contraction of a water-containing wet gel in a drying process is suppressed. That is, water (which is a solvent having a large surface tension) is first removed from the water-containing wet gel and then the remaining solvent is dried. According to this approach, any type of water-containing gel can be dried without formation of cracks in a drying process.

To describe more specifically, a water-containing wet gel contains water and other solvents of general use such as an alcohol, an amide, a hydrocarbon, a fluorinated hydrocarbon, a ketone, an ester and an ether. These solvents are each present as vapor having a partial pressure in accordance with the vapor pressure of each solvent in the space of a container storing a water-containing gel. According to one embodiment, a gas containing water and other organic solvents can be exposed to a dehydrating agent to allow the dehydrating agent to adsorb exclusively water or only water as much as possible, thereby reducing the vapor pressure of water in the gas. In this manner, water is allowed to further vaporize from the water-containing gel. The procedure is repeated to reduce the water content of the water-containing wet gel. When the water content reaches the level at which substantially no cracks are formed during a drying process, the removal of water is terminated. Then, the remaining solvents are dried by vaporization to obtain a dry gel.

Examples of the dehydrating agent that can be used include a dehydrating agent by physical adsorption such as a molecular sieve and silica gel, and a chemical dehydrating agent such as a phosphorus pentaoxide, concentrated sulfuric acid, calcium chloride and calcium oxide (caustic lime). As the mechanical dehydration unit, for example, a cold trap can be used. However, a molecular sieve can be advantageously used as a dehydrating agent since it can adsorb water alone highly efficiently and selectively and it is inexpensive and easily regenerated. Note that in the case a solvent having a small molecular diameter such as ethanol is contained, a molecular sieve, which does not adsorb the solvent molecule, can be used in order to selectively remove water. As such a molecular sieve, for example, molecular sieve 3A (potassium-substituted type-A zeolite) and 2A (cesium-substituted type-A zeolite) are mentioned.

As the wet gel to be dried, any water-containing wet gel may be used. Either an inorganic gel or an organic gel may be used. As the inorganic gel, for example, a silica gel, an alumina gel, a zirconia gel, a titania gel and a vanadia gel are mentioned. Furthermore, as the organic gel, for example, a resorcinol/formaldehyde gel, a melamine/formaldehyde gel, an isocyanurate gel, a polyurea gel, a urethane gel and a phenol/furfural gel are mentioned. As the organic/inorganic composite gel, for example, an alkyl-substituted silicon alkoxide polymer is mentioned. Furthermore, as the wet gel that can be used with the methods disclosed herein, a silica wet gel is one suitable example. The silica wet gel can be produced from water glass, alkoxy silane such as tetramethoxysilane or tetraethoxysilane, and oligomers of these or a colloidal silica as a raw material in accordance with a sol-gel method. When an alkoxy silane is used, water is added to an alcohol solution thereof and further an alkali or an acid is added as a catalyst. In this way, hydrolysis and polymerization of the alkoxy silane may be performed.

In the step of removing water from a water-containing wet gel the water-containing wet gel may or may not be heated. If heat is applied, the solvent vapor pressure increases and dehydration can be performed in a short time. Therefore, heating the gel can be advantageous. Dehydration can be performed by constructing a totally airtight system having a water-containing wet gel storage section and a dehydrating agent storage section communicating with each other. The gas containing a water-containing solvent present in the water-containing wet gel storage section is fed to the dehydrating agent storage section by diffusion or with the help of a gas supply apparatus such as a blower. In this way, the gas containing a water-containing solvent can be exposed to a dehydrating agent. In the case where a solvent-vapor containing gas is, for example, diffused and exposed to the dehydrating agent, when water is removed by the dehydrating agent, the concentration of water contained in the gas differs from that of the ambient gas. As a result, the water molecules diffuse toward the dehydrating agent. In this way, the water content of the solvent-vapor containing gas becomes uniform and maintained. When the procedure is repeated, the water in the solvent-vapor containing gas is gradually removed. At last, the concentration of water in the water-containing wet gel decreases. Furthermore, a solvent-containing gas in the water-containing wet gel storage section may be fed to the dehydrating agent storage section not only by simple diffusion but also by use of a blower to expose the solvent-containing gas to a dehydrating agent. After the gas is dehydrated, if the gas (from which water has been removed) is again transferred to the water-containing wet gel storage section, the water-containing wet gel can be dehydrated in a shorter time.

It is not necessary to completely remove all of the water from the water-containing wet gel. Water may remain if the concentration of water is virtually sufficient to obtain a crack-free dry gel by drying the resultant wet gel. The water content of a water-containing wet gel can be obtained by measuring, for example, the partial pressure or water content of a vapor-containing gas in the wet gel storage section. Therefore, the point of terminating a water removal step can be determined by detecting these values. Although treatment time varies depending upon the water content, the type and amount of dehydrating agent and either forcible circulation or simple diffusion, a crack-free dry gel can be obtained (by drying) if the aforementioned dehydration step is performed usually for about one or two days.

The water-containing wet gel, from which water has been removed as mentioned above, can then be heated to vaporize solvents from the gel. In this manner, the gel is dried. The heating temperature can be maintained at a relatively low temperature (for example, 40 to 200° C. in the case of a silica gel) until almost all solvents are removed by vaporization. Thereafter, heating is performed at a relatively high temperature (for example, 200 to 800° C. in the case of a silica gel) in order to remove solvents and organic components remaining in the gel in trace amounts.

Figure 2:
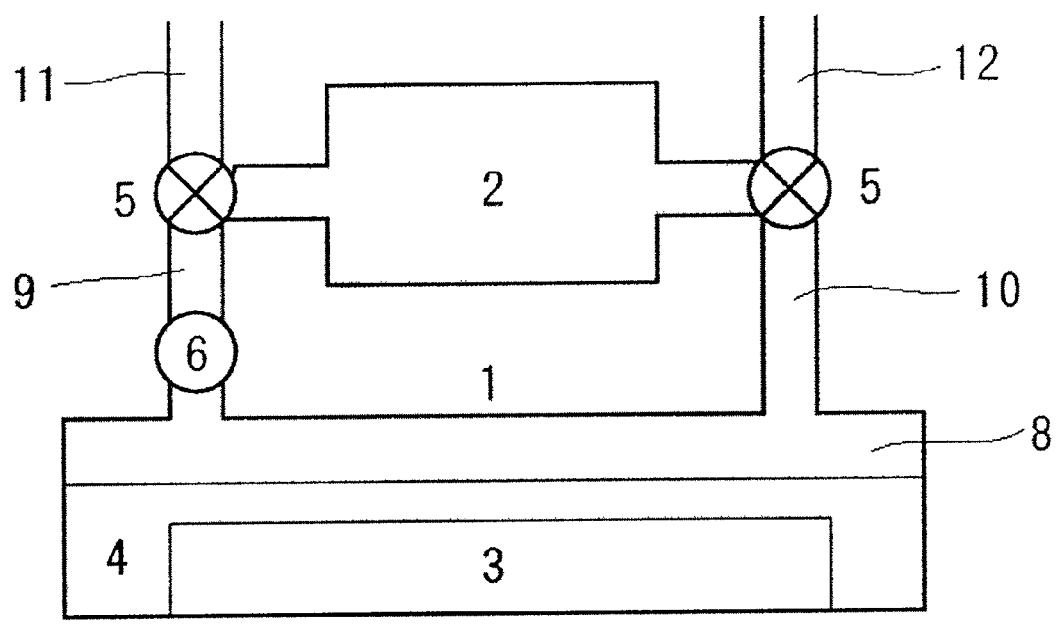
FIG. 2 is a schematic view of another example of the apparatus for drying a water-containing wet gel.

Next, referring to FIGS. 1 and 2, a method and an apparatus for dehydrating and drying a water-containing wet gel will be more specifically described. Note that the apparatuses shown in FIG. 1 and FIG. 2 are examples of an apparatus for use in the method for drying a water-containing wet gel. However, the apparatus for drying the water-containing wet gel is not limited to these.

FIG. 1 exemplifies a drying apparatus according to one aspect. In FIG. 1, a wet-gel container 1 constitutes a water-containing wet gel storage section and a dehydrating agent container 2 constitutes a dehydrating agent storage section storing a dehydrating agent (not shown). In the wet-gel container 1, a wet gel 3 and a solvent 4 are stored. In the drying apparatus of FIG. 1, the dehydrating agent container 2 is fitted or screwed onto the wet-gel container 1. The wet-gel container 1 and the dehydrating agent container 2 form an airtight space. In the bottom surface of the dehydrating agent container 2, holes 7 are formed, through which the upper space 8 of the wet-gel container 1 communicates with the dehydrating agent storing space within the dehydrating agent container 2 to allow the solvent vapor of the upper space 8 of the wet-gel container 1 to expose to the dehydrating agent. In FIG. 1, the dehydrating agent container 2 is fitted onto the top of the wet-gel container 1; however, it may be attached to the side surface of the wet-gel container 1.

A method for drying a water-containing wet gel using the apparatus will be described. First, in the state where the dehydrating agent container 2 is detached, a wet gel is formed in the wet-gel container 1. The wet gel is formed, for example, by placing gel forming materials in the wet-gel container 1, reacting them to form a gel, and aging the gel to reinforce it. Note that, a gel may be formed by another container and then transferred to the wet-gel container 1 together with a solvent. Furthermore, an appropriate amount of solvent within the container is removed to reduce drying time. Then, the dehydrating agent container 2 storing a dehydrating agent is fitted or screwed onto the top of the wet-gel container 1 to close the whole apparatus airtight. In this state, the wet-gel container 1 is heated by an optional heating means and maintained at this state.

At this time, the solvent of the water-containing wet gel is vaporized by heating and diffuses in the dehydrating agent container 2 through the holes 7. Consequently, only a water component of the solvent vapor is removed by the dehydrating agent. In this manner, vapor pressure of water in the gas decreases. The water content of the gas becomes different from the ambient gas having high water content. To reduce the difference in water content (concentration), water is diffused from the ambient gas having high water content. In this way, water is sequentially removed from the solvent vapor in the wet-gel container 1. When the vapor pressure of water in the solvent vapor within the wet-gel container 1 decreases, water is vaporized from the solvent 4 within the container 1. In this way, the water content of the solvent gradually decreases. If the state is maintained for one to two days, the water content of the solvent 4 in the container is almost completely removed. At this time, if an apparatus for measuring the water content in the gas present in the space of the wet-gel container 1 is attached to the wet-gel container 1, the water content of the gas can be measured by the apparatus. If the water-content reaches a predetermined value or less, the step of removing water may be terminated. Alternatively, in place of providing the measuring apparatus, the gas may be sampled from the space of the container and analyzed. Based on the gas analysis, the point of termination of the water removal step may be determined.

After removal of water is completed, the dehydrating agent container 2 is detached and the wet-gel container 1 is heated to remove the solvent, from which water has been removed, by vaporization. After the solvent is almost completely removed by vaporization, the container 1 is further heated to a higher temperature to completely remove the solvent. In this manner, a crack-free dry gel can be obtained.

FIG. 2 exemplifies another embodiment of a drying apparatus for performing methods disclosed herein. In FIG. 2, like reference numerals are used to designate like structural elements having the same functions as in FIG. 1. The drying apparatus of FIG. 2 is formed of a wet-gel container 1, a dehydrating agent container 2, communication pipes 9, 10 communicating these and a blower 6 provided on the communication pipe 9. Furthermore, to the communication pipes, cocks 5 are provided. When the cocks are turned, the wet-gel container 1 communicates with the dehydrating agent container 2, the wet-gel container 1 communicates with external pipes 11, 12, and the dehydrating agent container 2 communicates with the external pipes 11, 12. The drying apparatus of FIG. 1 differs from that of FIG. 2 in how to expose the solvent-vapor containing gas (in the upper space of the wet-gel container 1) to the dehydrating agent. In FIG. 1, diffusion of a gas is utilized, whereas in FIG. 2, the solvent-vapor containing gas is mechanically circulated by a blower.

An example of how to dry a water-containing wet gel by the drying apparatus of FIG. 2 will be described. When the cocks 5 are turned, the wet-gel container 1 is allowed to communicate with the dehydrating agent container 2 through the communication pipes. While the wet-gel container 1 is heated, the solvent containing gas in the upper space of the wet-gel container 1 is circulated through the dehydrating agent container 2 by the blower 6. After this state is maintained for about one to two days, or after completion of water removal is confirmed based on the vapor pressure of water or the water content in the upper space 8 above the solvent, the cock 5 is turned to allow the wet-gel container 1 to communicate with the external pipes. In this manner, the solvent is removed from the wet gel. After the solvent is almost completely removed, the heating temperature is further increased to completely remove the solvent from the wet gel to form a crack-free dry gel. In the apparatus of FIG. 2, when the cocks 5 are turned, the dehydrating agent container 2 is allowed to communicate with the external pipes 11, 12 to feed dry air to the dehydrating agent container 2 through the external pipes, and simultaneously, the dehydrating agent container 2 is, for example, heated to further regenerate the dehydrating agent stored in the container.

Dry gel obtained as described herein is porous and thus can be used as a heat insulating agent, an adsorbing agent, a catalyst carrier and a sound absorption material, etc. similarly to the dry gel obtained by a conventional drying method. Furthermore, when a silica gel is used as a dry gel, silica glass can be obtained by sintering the gel. Silica glass is expected to be used in luminescence materials, laser materials, photomagnetic/optical materials and photo/magnetic functional materials as hosts of metal ions. Furthermore, silica glass is excellent in transparency and can be doped with a modification element. Thus, use in optical devices such as optical connectors and optical fiber materials can be expected.

EXAMPLES

Embodiments will be more specifically described by way of Examples, which a presented for purposes of illustration and are not limiting to the scope of the methods and apparatuses disclosed herein. Note that the following Examples and Comparative Examples each were performed by use of the drying apparatus having the structure shown in FIG. 1.

Example 1

To tetraethoxysilane (5.21 g), ethanol (4.61 g) and water (4.50 g) containing nitric acid (0.032 g) were added and stirred at 20° C. for 10 minutes to obtain a homogeneous transparent solution. A container 1 containing the solution was closed airtight and allowed to stand still at 80° C. for 2 days to perform gelatinization and aging of the gel. A container 2 was charged with molecular sieve 3A (about 27 g), which was previously dried in a dry air of 300° C. for 3 hours or more, and connected to the container 1 containing the wet gel and allowed to stand still at 80° C. for further one day to dehydrate the solvent contained in the wet gel. Subsequently, the container 2 containing the molecular sieve 3A was detached and the container containing the wet gel was allowed to be open and dried at 80° C. As a result, the gel was completely dried in 3 days to obtain a crack-free dry gel. The dry gel obtained was subjected to a heat treatment performed in air at 300° C. to remove organic components, and thereafter nitrogen adsorption was measured. As a result, the total pore volume, the BET specific surface area and the average pore diameter, which was calculated from these two values assuming that the pores have a cylindrical shape, were 0.53 $cm^3g^{-1}$, 946 $m^2g^{-1}$ and 2.3 nm, respectively.

Comparative Example 1

To tetraethoxysilane (5.21 g), ethanol (4.61 g) and water (4.50 g) containing nitric acid (0.032 g) were added and stirred at 20° C. for 10 minutes to obtain a homogenous transparent solution. A container 1 containing the solution was closed airtight and allowed to stand still at 80° C. for 2 days to perform gelatinization and aging of the gel. The container closed airtight was allowed to stand still at 80° C. for further one day without removing water from the solvent contained in the wet gel. Subsequently, the container containing the wet gel was allowed to be open and dried at 80° C. As a result, the gel was completely dried in 4 days to obtain a dry gel having several cracks. The dry gel obtained was subjected to a heat treatment performed in air at 300° C. to remove organic components, and thereafter nitrogen adsorption was measured. As a result, the total pore volume, the BET specific surface area and the average pore diameter, which was calculated from these two values assuming that the pores have a cylindrical shape, were 0.45 $cm^3g^{-1}$, 808 $m^2g^{-1}$ and 2.2 nm, respectively. No significant difference was observed compared to the dry gel obtained in Example 1.

Example 2

To tetraethoxysilane (5.21 g), 2-propanol (4.51 g) and water (4.51 g) containing hydrogen fluoride (0.051 g) were added and stirred at 20° C. for 5 minutes to obtain a homogeneous transparent solution. A container 1 containing the solution was closed airtight and allowed to stand still at 20° C. The solution was changed to gel in about 25 minutes. The container containing the wet gel was connected to a container 2 charged with molecular sieve 3A (about 27 g) and allowed to stand still at 60° C. for 2 days to remove water from the solvent contained in the wet gel. Subsequently, the container 2 containing the molecular sieve 3A was detached and the container 1 having the wet gel therein was allowed to be open and dried at 60° C. As a result, the gel was dried in 2 days to obtain a crack-free dry gel. The dry gel obtained was subjected to a heat treatment performed in air at 300° C. to remove organic components, and thereafter nitrogen adsorption was measured. As a result, the total pore volume, the BET specific surface area and the average pore diameter, which was calculated from these two values assuming that the pores have a cylindrical shape, were 1.52 cm$^3$g$^{-1}$, 506 m$^2$g$^{-1}$ and 12 nm, respectively.

Comparative Example 2

To tetraethoxysilane (5.21 g), 2-propanol (4.51 g) and water (4.51 g) containing hydrogen fluoride (0.051 g) were added and stirred at 20° C. for 5 minutes to obtain a homogenous transparent solution. A container 1 containing the solution was closed airtight and allowed to stand still at 20° C. The solution was changed to gel in about 25 minutes. The container closed airtight was allowed to stand still at 60° C. for two days without removing water from the solvent contained in the wet gel. Subsequently, the container having the wet gel was allowed to be open and dried at 60° C. As a result, the gel was completely dried in 3 days to obtain a dry gel having several tens of cracks. The dry gel obtained was subjected to a heat treatment performed in air at 300° C. to remove organic components, and thereafter nitrogen adsorption was measured. As a result, the total pore volume, the BET specific surface area and the average pore diameter, which was calculated from these two values assuming that the pores have a cylindrical shape, were 1.44 cm$^3$g$^{-1}$, 357 m$^2$g$^{-1}$ and 16 nm, respectively. No significant difference was observed compared to the dry gel obtained in Example 1.

Dry gel obtained using embodiments of the methods and apparatuses disclosed herein can be used as a heat insulating agent, an adsorbing agent, a catalyst carrier and a sound absorption material. Silica glass, which is obtained by sintering the dry gel, can be used as luminescence materials, laser materials and photo/magnetic functional materials as hosts of metal ions.

What is claimed is:

1. A method for drying a water-containing wet gel comprising:
    removing water from the water-containing wet gel to reduce the water content of the water-containing wet gel by exchanging water in the water-containing wet gel for a solvent other than water by a liquid-vapor contact process, the exchanging including:
        contacting the water-containing gel with a gas containing a vapor of the solvent in a wet-gel container to remove water from the water-containing wet gel and exchange water in the water-containing wet gel for the solvent;
        feeding the gas containing the vapor of the solvent and water removed from the water-containing wet gel to a dehydrating agent container that contains a dehydrating agent to produce a dried gas;
        feeding back the dried gas containing the vapor of the solvent to the water-containing wet gel in the wet-gel container; and
    removing the solvent other than water from the wet gel to yield a dry gel.

2. The method for drying a water-containing wet gel according to claim 1, wherein feeding the gas containing the vapor is performed by diffusing the gas containing the vapor of the solvent through a hole formed in the dehydrating agent container to expose the gas to the dehydrating agent stored in the dehydrating agent container.

3. The method for drying a water-containing wet gel according to claim 1, wherein the dehydrating agent is a molecular sieve.

4. The method for drying a water-containing wet gel according to claim 1, wherein the water-containing wet gel is a water-containing silica gel.

5. The method for drying a water-containing wet gel according to claim 1, wherein the solvent other than water is an organic solvent selected from the group consisting of an alcohol, an amide, a hydrocarbon, a ketone, an ester, an ether, and combinations thereof.

6. The method for drying a water-containing wet gel according to claim 4, further comprising sintering the wet gel after drying.

7. The method of claim 1, further comprising repeating the contacting, feeding, and feeding back until substantially all of the water in the water-containing gel is exchanged for the solvent other than water.

8. The method of claim 1, wherein contacting the water-containing gel with a gas containing a vapor of the solvent comprises:
    contacting the water-containing gel in the wet-gel container with the gas containing the vapor of the solvent to remove water from the water-containing wet gel and exchange the water in the water-containing wet gel for the solvent, wherein the solvent is a non-aqueous solvent.

9. A method for drying a water-containing wet gel comprising:
    exchanging water in the water-containing wet gel for a non-aqueous solvent in a vapor contact process that includes:
        disposing the water-containing wet gel in a wet-gel container;
        contacting the water-containing gel in the wet-gel container with a gas containing a vapor of the non-aqueous solvent to remove water from the water-containing wet gel and exchange water in the water-containing wet gel for the non-aqueous solvent;
        conveying the gas containing the vapor of the non-aqueous solvent and water removed from the water-containing wet gel to a dehydrating agent container containing a dehydrating agent;
        producing a dehydrated gas by contacting the gas containing the vapor of the non-aqueous solvent and water removed from the water-containing wet gel with the dehydrating agent;
        transferring the dehydrated gas containing the vapor of the non-aqueous solvent back to the wet-gel container;
        repeating the contacting, conveying, producing, and transferring steps until the water in the water-containing wet gel is exchanged for the non-aqueous solvent to yield a wet gel; and
    removing the non-aqueous solvent from the wet gel to yield a dry gel.

* * * * *